(No Model.)
C. A. SCHLOER.
SUPPORT FOR BICYCLES.
No. 531,338. Patented Dec. 25, 1894.
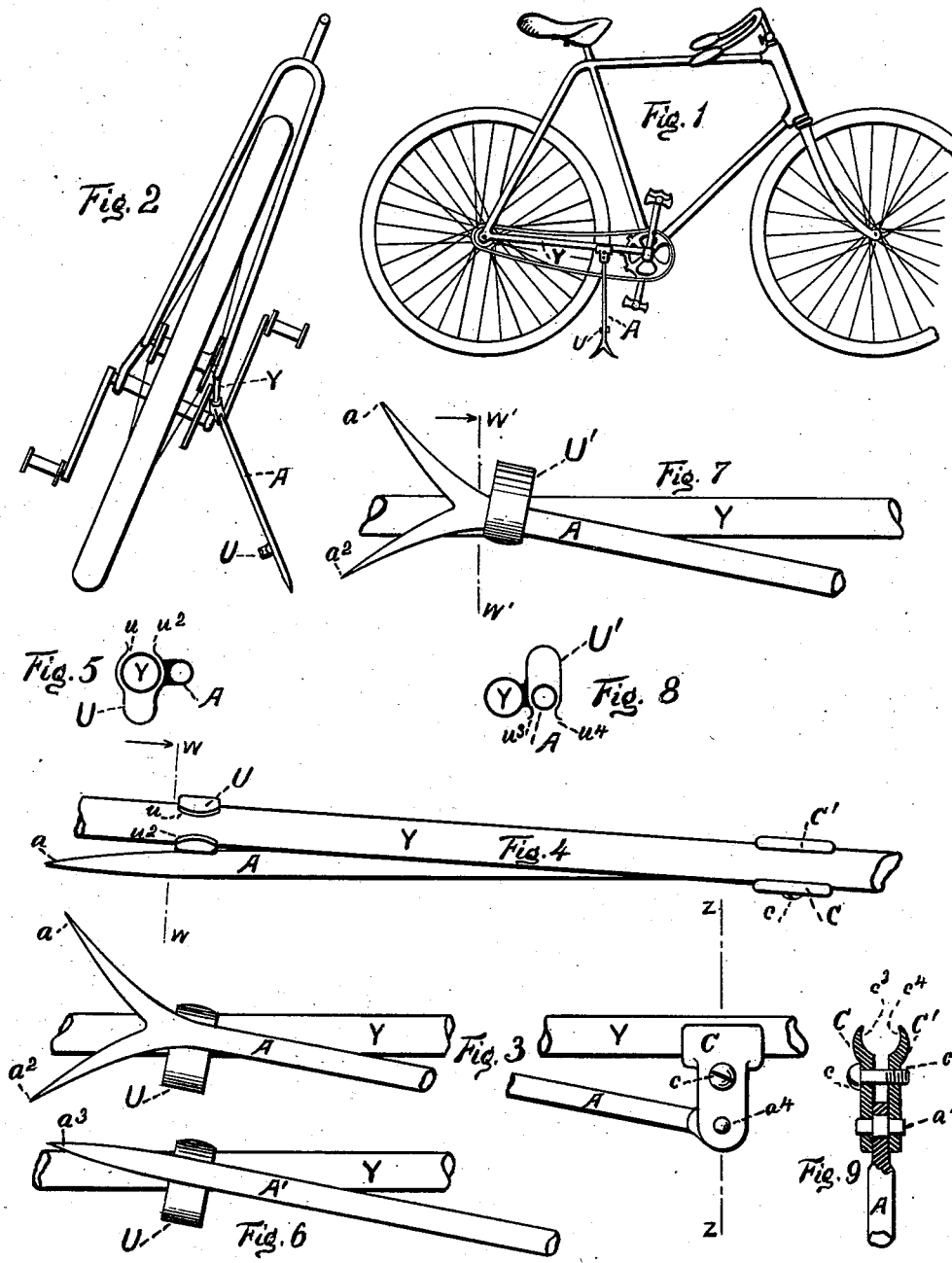
WITNESSES:
Arthur C. Snyder
W. Roy Johnson
INVENTOR
Charles A. Schloer
BY
Chas. N. Butler
ATTORNEY.

UNITED STATES PATENT OFFICE.

CHARLES A. SCHLOER, OF CAMDEN, NEW JERSEY.

SUPPORT FOR BICYCLES.

SPECIFICATION forming part of Letters Patent No. 531,338, dated December 25, 1894.

Application filed March 26, 1894. Serial No. 505,185. (No model.)

*To all whom it may concern:*

Be it known that I, CHARLES A. SCHLOER, a citizen of the United States, residing in the city of Camden, county of Camden, and State of New Jersey, have invented a new and useful Support for Bicycles, of which the following is a specification.

The object of my invention is to provide a support for bicycles which, when the machine is in motion, may lie snugly against a bar of the machine frame so as not to interfere with the rider, and when the machine is stationary may be thrown down in position to support the machine in an approximately vertical position. This device may be attached to any wheel. It is compact, light, durable, simple of construction and use, and consequently inexpensive. The mechanism is illustrated in the accompanying figures of drawings, in which—

Figure 1 is a side elevation of a bicycle with the support attached and in position for use; Fig. 2, an end elevation of the structure shown in Fig. 1; Fig. 3, a side view of the support when not in use, illustrating its connections with the bicycle frame; Fig. 4, a top view of the structure shown in Fig. 3; Fig. 5, a section taken on the line W—W of Fig. 4; Fig. 6, a view showing a modification; Fig. 7, a view showing a second modification; Fig. 8, a section taken on the line W'—W' of Fig. 7; and Fig. 9, a section taken on the line Z—Z of Fig. 3.

Similar letters refer to the same parts throughout the several views.

The strut or leg A, having the feet or bifurcations $a$, $a^2$, has attached to it a U shaped spring clasp lettered U. At its opposite end it is cored to receive an arbor $a^4$ upon which it is pivoted. The arbor $a^4$ rests in bearings formed in the clamp C—C', and is capable of being entirely separated from both the clamp and the strut by removing the screw $c$, the arbor being normally held in place by forming its middle section of greater diameter than its extremities. The clamp C—C', comprising the separable members C and C', is provided with the gripping jaws $c^3$ and $c^4$. These members are held in place by means of the screw $c$ threaded at $c^2$. It is found desirable to use canvas or rubber linings for the clamp jaws to avoid scarring the bicycle frame, and to reduce the tendency of the clamp to turn upon the frame bar to which it is attached. By simply removing the screw $c$, which may be moved by either a screw-driver or thumb-nut, the parts are segregated.

To secure greater compactness I may use a strut A' (Fig. 6) having a single point $a^3$. I may also vary my device by attaching my U shaped spring clasp to the side bar Y of the machine frame with its jaws extending downward to receive the strut A, the arrangement being designated by the letters U', $w^3$ and $w^4$ in Figs. 7 and 8.

While I have shown my support attached to the side bar Y of the machine frame, it may, as will readily appear, be made of different lengths suitable for use in connection with other members of the frame. It may also be made adjustable in length.

This support may be attached to any bicycle by loosening the screw $c$ until the jaws of the clamp are sufficiently open to receive the frame bar Y. The support is then adjusted to the desired angle for stability with the vertical plane of the wheel, and made fast by drawing up the screw.

When not in use the strut is swung upon its arbor $a^4$ to the position shown in Fig. 3, the bar Y forcing open the jaws $w$ and $w^2$ of the spring U, which engagement holds in place the strut A. When the rider dismounts the spring clasp U is withdrawn from its engagement with the bar Y and the strut A permitted to fall. The wheel is canted until the feet of the strut strike the ground in which position the bicycle is supported, the feet affording a means of resisting the wheel's tendency to move when standing upon a grade and greater stability generally.

I claim—

1. In combination with a bar of a bicycle frame, a clamp comprising the members C and C' having the gripping jaws $c^3$ and $c^4$, the screw $c$, the shouldered arbor $a^4$, and the strut A journaled on the arbor between the clamp members substantially as shown and described.

2. A new article of manufacture comprising a clamp having the gripping jaws $c^3$ and $c^4$ controlled by the screw $c$, the removable shouldered arbor $a^4$, the pivoted strut A and the spring clasp U carried by the strut.

CHARLES A. SCHLOER.

Witnesses:
CHARLES N. BUTLER,
ARTHUR C. SNYDER.